United States Patent
Liu et al.

(10) Patent No.: US 10,430,082 B2
(45) Date of Patent: Oct. 1, 2019

(54) SERVER MANAGEMENT METHOD AND SERVER FOR BACKUP OF A BASEBAND MANAGEMENT CONTROLLER

(71) Applicant: Huawei Technologies Co., Ltd., Shenzhen (CN)

(72) Inventors: Jinshui Liu, Plano, TX (US); Tongling Song, Shenzhen (CN); Wei Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/877,997

(22) Filed: Jan. 23, 2018

(65) Prior Publication Data

US 2018/0188969 A1   Jul. 5, 2018

Related U.S. Application Data

(63) Continuation of application No. PCT/CN2016/113901, filed on Dec. 30, 2016.

(51) Int. Cl.
   *G06F 12/00* (2006.01)
   *G06F 3/06* (2006.01)
   *G06F 1/18* (2006.01)

(52) U.S. Cl.
   CPC ............ *G06F 3/0608* (2013.01); *G06F 1/187* (2013.01); *G06F 3/065* (2013.01); *G06F 3/0607* (2013.01); *G06F 3/0619* (2013.01); *G06F 3/0665* (2013.01); *G06F 3/0689* (2013.01)

(58) Field of Classification Search
   CPC .... G06F 3/0608; G06F 3/0607; G06F 3/0619; G06F 3/065; G06F 3/0665; G06F 3/0689
   USPC .......................................................... 711/103
   See application file for complete search history.

(56) References Cited

U.S. PATENT DOCUMENTS

| 2013/0205063 A1 | 8/2013 | Zhang et al. |
| 2015/0006700 A1 | 1/2015 | Wanner |
| 2015/0058538 A1 | 2/2015 | Chao et al. |
| 2015/0347153 A1 | 12/2015 | Chou et al. |

FOREIGN PATENT DOCUMENTS

| CN | 201194094 Y | 2/2009 |
| CN | 102439565 A | 5/2012 |
| CN | 104461386 A | 3/2015 |
| CN | 105892368 A | 8/2016 |

OTHER PUBLICATIONS

Machine Translation and Abstract of Chinese Publication No. CN102439565, May 2, 2012, 13 pages.

(Continued)

*Primary Examiner* — Mardochee Chery
(74) *Attorney, Agent, or Firm* — Conley Rose, P.C.

(57) ABSTRACT

A server management method and a server, where the server is divided into two parts, a computing component and a storage component, according to a part maintenance cycle. The computing component and the storage component are connected in a detachable manner. The computing component includes a part with a short maintenance cycle, and the storage component includes a part with a long maintenance cycle. Therefore, the computing component or the storage component can be flexibly replaced during server maintenance, and maintenance efficiency is high.

18 Claims, 9 Drawing Sheets

(56) References Cited

OTHER PUBLICATIONS

Machine Translation and Abstract of Chinese Publication No. CN104461386, Mar. 25, 2015, 7 pages.
Machine Translation and Abstract of Chinese Publication No. CN105892368, Aug. 24, 2016, 12 pages.
Machine Translation and Abstract of Chinese Publication No. CN201194094, Feb. 11, 2009, 12 pages.
Foreign Communication From a Counterpart Application, International Application No. PCT/CN2016/113901, International Search Report dated Sep. 28, 2017, 12 pages.
Foreign Communication From a Counterpart Application, European Application No. 16909058.6, Extended European Search Report dated Oct. 31, 2018, 7 pages.

SERVER MANAGEMENT METHOD AND SERVER FOR BACKUP OF A BASEBAND MANAGEMENT CONTROLLER

CROSS-REFERENCE TO RELATED APPLICATIONS

This application is a continuation of International Patent Application No. PCT/CN2016/113901 filed on Dec. 30, 2016, which is hereby incorporated by reference in its entirety.

TECHNICAL FIELD

The present disclosure relates to the computer field, and in particular, to a server management method and a server.

BACKGROUND

With growth of services, a problem that a processing capability of a server does not meet a service processing need occurs. The server needs to be upgraded at a specific interval for replacement with a part with a stronger processing capability. The server includes a large quantity of parts such as a fan, a memory, a network adapter, a disk, and a processor. All parts of the server are integrated on one mainboard. The parts have different upgrade cycles. For example, an upgrade cycle of the mainboard, the processor, or the memory is relatively short, and is usually two to three years, whereas an upgrade cycle of the disk is relatively long, and is usually five to seven years. It can be learned from a present server architecture that all the parts of the server are integrated on one mainboard. When maintaining multiple parts on the mainboard, a maintenance engineer needs to sequentially remove and insert the multiple parts on the mainboard. Consequently, maintenance efficiency is low.

SUMMARY

This application discloses a server management method and a server in order to flexibly replace a computing component or a storage component of the server, and improve maintenance efficiency.

According to a first aspect, this application discloses a server, where the server includes a computing component and a storage component, and the computing component includes a baseband management controller (BMC), a processor system, a computing mainboard, a computing part, and a first connector. The computing mainboard is a carrier for all parts of the computing component, and the BMC, the processor system, the computing part, and the first connector may be disposed on the computing mainboard. The processor system is a processor network including one or more processors, and a processor may be a single-core processor or a multi-core processor. The computing part is a part that performs a specific service function, and the computing part may be a network adapter, an audio adapter, a MEZZ card, or a graphics processing card. The processor system is separately connected to the BMC and the first connector. The storage component includes a disk, a storage mainboard, a second memory, and a second connector. The storage mainboard is a carrier for all parts of the storage component, and the disk, the second memory, and the second connector are disposed on the storage mainboard. There may be one or more disks, and a disk may be a hard disk drive (HDD) or a solid state drive (SSD). When there are multiple disks, the multiple disks may form a Redundant Arrays of Independent Disk (RAID). The second memory stores backup configuration information of the computing part. The backup configuration information of the computing part is used to restore a configuration parameter of the computing part. The second memory is a non-volatile memory and features no data loss during a power failure. The computing mainboard and the storage mainboard are two separate mainboards. The computing mainboard and the storage mainboard are connected in a detachable manner using the first connector and the second connector. The first connector and the second connector match each other. For example, the first connector is a universal serial bus (USB) connector, and the second connector is a USB socket. Alternatively, the first connector is a USB socket, and the second connector is a USB connector. Alternatively, the first connector is a male Peripheral Component Interconnect Express (PCIE) connector, and the second connector is a female PCIE connector. Alternatively, the first connector is a female PCIE connector, and the second connector is a male PCIE connector. Alternatively, the first connector is a Serial Advanced Technology Attachment (SATA) connector, and the second connector is a SATA socket. It may be understood that the first connector and the second connector may be connected using the foregoing male-female connectors, using a cable, or in another detachable manner. This is not limited in this application. When the first connector and the second connector are interconnected, the BMC is connected to the second memory using the first connector and the second connector, and the processor system is connected to the disk using the first connector and the second connector.

In the foregoing embodiment, the server is divided into two parts, the computing component and the storage component according to a part maintenance cycle. The computing component and the storage component are connected in a detachable manner. The computing component includes a part with a short maintenance cycle, and the storage component includes a part with a long maintenance cycle. Therefore, the computing component or the storage component can be flexibly replaced during server maintenance, and maintenance efficiency is high.

In a possible implementation of this aspect, functions of the parts of the server are as follows. The BMC is configured to restore the configuration parameter of the computing part according to the backup configuration information of the computing part that is stored in the second memory when the computing part is replaced, and the processor system is configured to copy, into the disk, a preset driver package of the computing part that is stored in a first memory, and start from the disk after the copy is completed.

By implementing the foregoing embodiment, the processor system configures the computing part according to a service channel of the processor system. This reduces resource occupation and can ensure that the computing part rapidly recovers to a normal state.

In a possible implementation of this aspect, when the computing part is replaced, the processor system is configured to restore the configuration parameter of the computing part according to the backup configuration information of the computing part that is stored in the second memory, copy, into the disk, a preset driver package of the computing part that is stored in a first memory, and start from the disk after the copy is completed.

In the foregoing embodiment, when the computing part is updated, the computing part is driven according to the driver package in the first memory, and the computing part is configured according to the backup configuration information prestored in the second memory such that the server automatically recovers to a normal state. In this case, an operating system does not need to be reinstalled, and configuration information is restored quickly. This implements plug-and-play of the computing component, shortens a maintenance time for upgrading the server, and reduces a maintenance difficulty.

In a possible implementation of this aspect, the BMC is configured to determine whether the computing part is replaced, if the computing part is replaced, set the preset first memory as a first boot device, and restart the computing part, where the first memory stores the driver package of the computing part, and the driver package of the computing part is used to drive the computing part. The processor system is configured to restart from the first memory, read the driver package of the computing part from the first memory after the restart, and copy the driver package of the computing part into the disk. The BMC is further configured to set the disk as the first boot device, and restart when the copy is completed, and the processor system is further configured to restart from the disk, and drive, after the restart, the computing part according to the driver package of the computing part that is stored in the disk.

In a possible implementation of this aspect, the first memory is located in the computing component of the server, that is, the computing component includes the first memory, the BMC is connected to the first memory, and the processor system is connected to the first memory. Alternatively, the first memory is located in a management server, both the processor system and the BMC are connected to the first memory, the management server manages multiple servers, and the server in this embodiment is any one of the multiple servers managed by the management server. In the foregoing embodiment, a deployment manner in which the first memory is located in the computing component is applicable to a single-server scenario and features a short recovery time. A deployment manner in which the first memory is located in the management server is applicable to a clustering scenario. This can effectively reduce storage space occupied by the driver package of the computing part, and facilitate centralized management.

In a possible implementation of this aspect, the second memory further stores backup configuration information of the computing mainboard, and the BMC is further configured to read the backup configuration information of the computing mainboard from the second memory, and configure the computing mainboard according to the backup configuration information of the computing mainboard. For example, the backup configuration information of the computing mainboard includes basic input/output system (BIOS) configuration information.

In a possible implementation of this aspect, the second memory further stores backup identity information of the computing part and backup identity information of the computing mainboard, and that the BMC determines whether the computing part is updated includes obtaining, by the BMC, identity information of the computing part, and obtaining the backup identity information of the computing part from the second memory, where the identity information includes but is not limited to one or more of a model, a serial number, or a media access control (MAC) address, determining whether the identity information of the computing part is the same as the backup identity information of the computing part, and determining that the computing part is updated if the identity information is different from the backup identity information.

In the foregoing embodiment, after the computing component and the storage component are interconnected, whether the computing mainboard and the network adapter are updated can be automatically determined. This features a high detection speed and low resource occupation.

In a possible implementation of this aspect, the BMC is further configured to update the backup identity information of the computing mainboard according to identity information of the computing mainboard when the computing mainboard is replaced, and update, according to the identity information of the computing part, the backup identity information of the computing part that is stored in the second memory when the computing component is replaced.

In a possible implementation of this aspect, the disk further stores RAID configuration information, there are multiple disks in the storage component, and the processor system is further configured to read the RAID configuration information from the disk, and configure the disk according to the RAID configuration information.

In a possible implementation of this aspect, the storage component further includes a RAID card. The RAID card is disposed on the storage mainboard, and the RAID card is connected to the disk and the second connector. When the first connector and the second connector are interconnected, the processor system is connected to the RAID card using the first connector and the second connector. The processor system is further configured to read RAID configuration information from the RAID card, and configure the disk according to the RAID configuration information.

According to a second aspect, this application discloses a server management method, where the server management method is applied to a server, and the server in this application includes but is not limited to a video server, a webpage server, a file server, or a data center server. A computing component includes a BMC, a computing mainboard, a processor system, a computing part, and a first connector. A storage component includes a disk, a storage mainboard, a second memory, and a second connector. The first connector and the second connector match each other. Therefore, the computing component and the storage component are connected in a detachable manner. When either the computing component or the storage component needs to be upgraded, a previous computing component or storage component can be directly removed and replaced with a new computing component or storage component. In the computing component, the processor system is separately connected to the BMC, the computing part, and the first connector, the computing mainboard is used as a carrier for all parts of the computing component, and the BMC, the computing part, the processor system, and the first connector are disposed on the computing mainboard. In the storage component, the storage mainboard is used as a carrier for all parts of the storage component, the second connector, the disk, and the second memory are disposed on the storage mainboard, and the second connector is separately connected to the disk and the second memory. When the first connector and the second connector are interconnected, the BMC is connected to the second memory using the first connector and the second connector, and the processor system is connected to the disk using the first connector and the second connector. The computing part primarily performs computation functions. The computation functions include but are not limited to functions such as data processing and control, voice processing and control, and text processing and control. Correspondingly, the computing part may be a network adapter, a graphics card, an image processing card, a MEZZ card, or a part of another type. The storage component is primarily configured to store a large amount of data. A type of the disk in the storage component is not limited, and there may be one or more disks. When there are multiple disks, the multiple disks may be all HDDs, all SSDs, or a mix of an HDD and an SSD. A first memory and the second memory are non-volatile memories (NVMs). The NVM features no data loss during a power failure, and the NVM includes but is not limited to a read-only memory (ROM), an erasable programmable ROM (EPROM), and a flash memory. The first memory stores a driver package of the computing part, and the driver package of the computing part is used to drive the computing part. The first memory may be disposed in the computing component of the server or outside the server. The second memory stores backup configuration information of the computing part, and the backup configuration information of the computing part is used to restore a configuration parameter of the computing part. The computing mainboard and the storage mainboard are two separate mainboards. The computing mainboard and the storage mainboard are connected in a detachable manner using the first connector and the second connector. The server management method includes restoring, when the computing part is replaced, the configuration parameter of the computing part according to the backup configuration information of the computing part stored in the second memory, and driving the computing part according to the driver package of the computing part that is stored in the first memory.

In a possible implementation of this aspect, when the computing part is replaced, the BMC restores the configuration parameter of the computing part according to the backup configuration information of the computing part stored in the second memory, and the processor system drives the computing part according to the driver package of the computing part that is stored in the first memory.

In a possible implementation of this aspect, when the computing part is replaced, the processor system restores the configuration parameter of the computing part according to the backup configuration information of the computing part that is stored in the second memory, copies, into the disk, the driver package of the computing part that is stored in the preset first memory, and starts from the disk after the copy is completed.

In a possible implementation of this aspect, copying, into the disk, the driver package of the computing part that is stored in the preset first memory includes starting from the first memory, reading the driver package of the computing part from the first memory after the start, and copying the driver package of the computing part into the disk.

In a possible implementation of this aspect, the BMC determines whether the computing part is updated, and if the computing part is updated, continues to determine whether the computing part supports out-of-band configuration. If the computing part supports the out-of-band configuration, the BMC can directly configure the computing part, and the BMC reads the backup configuration information of the computing part from the second memory, and correspondingly configures the computing part according to the backup configuration information of the computing part. For example, the computing part is a network adapter, and the BMC configures a MAC address, an Internet Protocol (IP) address, a gateway address, another address, and the like of the network adapter according to backup configuration information of the network adapter. The BMC sets the first memory as a first boot device and restarts. The processor system restarts from the first memory, reads the driver package of the computing part in the first memory after the restart, and copies the driver package into the disk. After the foregoing copy operation is completed, the BMC sets the disk as the first boot device, and restarts. The processor system starts from the disk, searches for the driver package of the computing part that is stored in the disk, and drives the computing part according to the driver package.

In the foregoing embodiment, when the computing part of the server is replaced, the computing part is driven according to the driver package in the first memory, and the computing part is configured according to the backup configuration information prestored in the second memory such that the server automatically recovers to a normal state. In this case, an operating system does not need to be reinstalled, and configuration information is restored quickly. This implements plug-and-play of the computing component, shortens a maintenance time for upgrading the server, and reduces a maintenance difficulty.

In a possible implementation of this aspect, the BMC determines whether the computing part is updated, and if the computing part is updated, reads the backup configuration information of the computing part from the second memory, stores the read backup configuration information of the computing part in the first memory, sets the first memory as a first boot device, and restarts. The processor system restarts from the first memory, and the first memory stores a thin operating system and management software. The thin operating system provides only basic functions and features a small size and low resource occupation, and the thin operating system may be a LINUX operating system, a UNIX operating system, a WINDOWS PE operating system, or another operating system. This is not limited in this application. After the restart, the processor system runs the management software in the operating system, and the management software reads the driver package of the computing part from the first memory, copies the driver package of the computing part into the disk, reads the backup configuration information of the computing part from the first memory, and configures the computing part according to the backup configuration information of the computing part. When the copy and the configuration are completed, the BMC sets the disk as the first boot device and restarts, and the processor system restarts from the disk, and drives, after the restart, the computing part according to the driver package of the computing part that is stored in the disk.

In a possible implementation of this aspect, the first memory stores backup configuration information of the computing mainboard, and the server management method further includes reading, by the BMC, the backup configuration information of the computing mainboard from the second memory, and configuring the computing mainboard according to the backup configuration information of the computing mainboard. In the foregoing embodiment, after configuration information of the computing mainboard is changed, the backup configuration information of the computing mainboard that is previously stored in the second memory is updated according to configuration information after the change in order to back up the configuration information of the computing mainboard in time.

In a possible implementation of this aspect, the second memory further stores backup identity information of the computing part and backup identity information of the computing mainboard. The BMC obtains identity information of the computing mainboard, reads the backup identity information of the computing mainboard from the second memory, and temporarily stores the read backup identity information of the computing mainboard in a designated place, for example, the first memory, in the computing component. The BMC determines whether the identity information of the computing mainboard is the same as the read backup identity information of the computing mainboard, and if the identity information is different from the read backup identity information, determines that the computing mainboard is replaced. That is, the current computing mainboard is a new computing mainboard, and correspondingly, the entire computing component is also replaced. The BMC obtains identity information of the computing part, reads the backup identity information of the computing part from the second memory, temporarily stores the read backup identity information of the computing part in a designated place in the computing component, determines whether the identity information of the computing part is the same as the read backup identity information of the computing part, and determines that the current computing part is updated if the identity information is different from the read backup identity information.

In a possible implementation of this aspect, the server management method further includes updating, according to the identity information of the computing mainboard, the backup identity information of the computing mainboard that is stored in the second memory when the computing mainboard is replaced, and updating, according to the identity information of the computing part, the backup identity information of the computing part that is stored in the second memory when the computing part is updated.

In a possible implementation of this aspect, the server management method further includes updating, according to configuration information after the change, the backup configuration information of the computing mainboard that is stored in the second memory when configuration information of the computing mainboard is changed, and updating, according to configuration information after the change, the backup configuration information of the computing part that is stored in the second memory when configuration information of the computing part is changed.

In a possible implementation of this aspect, there are multiple disks in the storage component, the multiple disks form a RAID in a software manner, and the disks store RAID configuration information. The processor system reads the RAID configuration information from the disks, and configures the disks according to the RAID configuration information. The RAID configuration information includes a RAID level, for example, a RAID 0 to a RAID 50.

In a possible implementation of this aspect, there are multiple disks in the storage component, and the multiple disks form a RAID in a hardware manner. The storage component further includes a RAID card. The processor system reads RAID configuration information from the RAID card, and configures the disks according to the RAID configuration information.

According to a third aspect, an embodiment provides a service system, including a management server and at least one service server. The management server includes a first memory. The first memory stores a driver package of a computing part included in each service server. Each service server includes a storage component and a computing component. The computing component includes a BMC, a processor system, a computing mainboard, a computing part, and a first connector. The BMC, the processor system, the computing part, and the first connector are disposed on the computing mainboard. The processor system is separately connected to the BMC, the first memory, the computing part, and the first connector. The storage component includes a second memory, a storage mainboard, a disk, and a second connector. The second memory, the disk, and the second connector are disposed on the storage mainboard. The second connector is separately connected to the disk and the second memory. The first connector and the second connector match each other. When the first connector and the second connector are interconnected, the BMC is connected to the second memory using the first connector and the second connector, and the processor system is connected to the disk using the first connector and the second connector. Functions of parts of each service server are as follows. The BMC of the service server is configured to determine whether the computing part is updated, determine whether the computing part supports out-of-band configuration if the computing part is updated, and if the computing part supports out-of-band configuration, obtain backup configuration information of the computing part from the second memory, configure the computing part according to the backup configuration information of the computing part, set the first memory as a first boot device, and restart. The processor system of the service server is configured to restart from the first memory, read the driver package of the computing part from the first memory after the restart, and copy the driver package of the computing part into the disk of the service server. The BMC of the service server is further configured to set the disk as the first boot device, and restart after the copy is completed, and the processor system of the service server is further configured to restart from the disk, and drive, after the restart, the computing part according to a driver package of the computing part that is stored in the disk.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure.

The embodiments of the present disclosure disclose a server management method, a server, and a service system.

The server includes a computing component and a storage component. The computing component and the storage component are connected in a detachable manner. The computing component includes a part with a short maintenance cycle, and the storage component includes a part with a long maintenance cycle. Therefore, the computing component or the storage component can be flexibly replaced during server maintenance, and maintenance efficiency is high.

Figure 1:
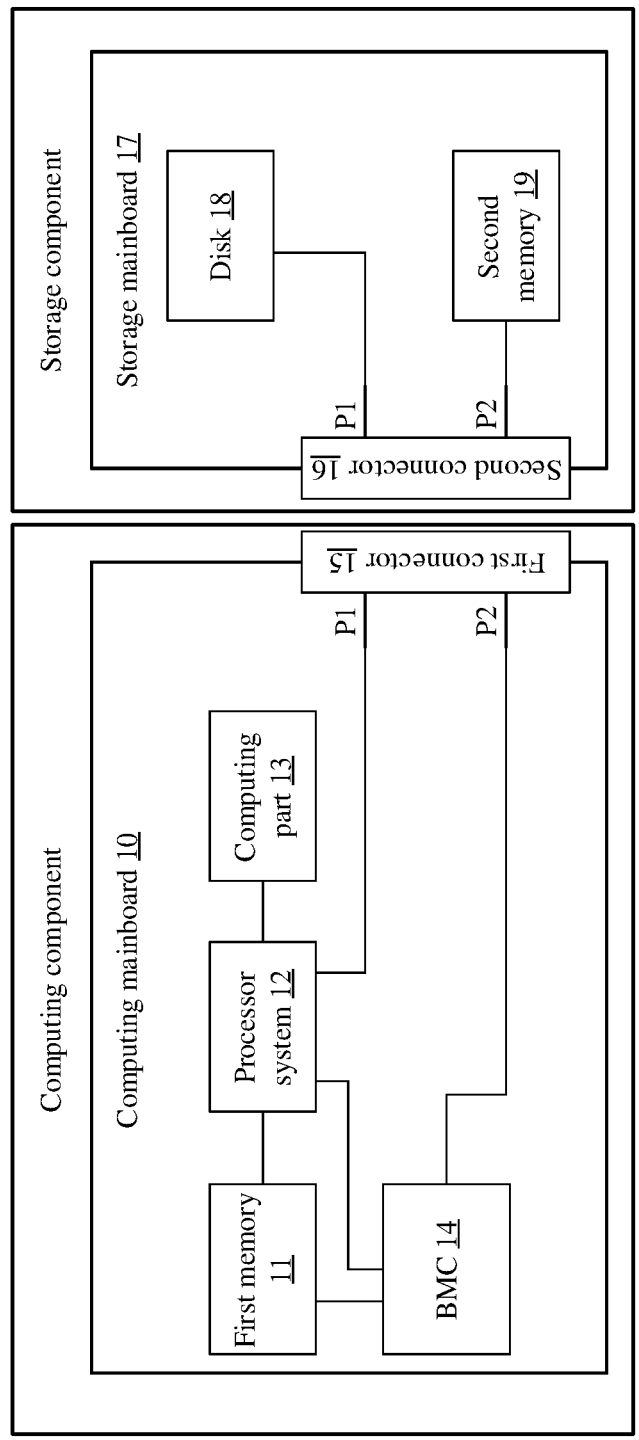
FIG. 1 is a schematic structural diagram of a server according to an embodiment of the present disclosure.

Referring to FIG. 1, FIG. 1 is a schematic structural diagram of a server according to an embodiment of the present disclosure. In this embodiment of the present disclosure, the server includes a computing component and a storage component. The computing component includes a computing mainboard 10, a first memory 11, a processor system 12, a computing part 13, a BMC 14, and a first connector 15. The first memory 11 is an NVM, and the first memory 11 may be a ROM, an EPROM, an electrically EPROM (EEPROM), or a flash memory. The first memory 11 stores a driver package of the computing part 13. The driver package of the computing part 13 is used to drive the computing part 13. The processor system 12 is a processor network including one or more processors. Each processor may be a single-core processor or a multi-core processor. When the processor system 12 is a processor network including multiple processors, the processors communicate with each other using an interconnection channel. The interconnection channel may be Quick Path Interconnect (QPI) or HYPERTRANSPORT (HT). The computing part 13 is a part that performs a designated computation task, and the computation task includes but is not limited to data packet processing, image processing, audio processing, or video processing. The computing part 13 includes but is not limited to a network adapter, an audio adapter, a MEZZ card, or a graphics processing card. The first memory 11, the processor system 12, the computing part 13, the BMC 14, and the first connector 15 are disposed on the computing mainboard 10. The processor system 12 is separately connected to the first memory 11, the BMC 14, the computing part 13, and the first connector 15. The BMC 14 is connected to both the first connector 15 and the first memory 11.

The storage component includes a second connector 16, a storage mainboard 17, a disk 18, and a second memory 19. The second connector 16, the disk 18, and the second memory 19 are disposed on the storage mainboard 17, and the second connector 16 and the first connector 15 match each other. The second memory 19 stores backup configuration information of the computing part 13. The backup configuration information of the computing part 13 is used to restore a configuration parameter of the computing part 13. Specific structures of the first connector 15 and the second connector 16 may be as follows. The first connector 15 is a male USB connector, and the second connector 16 is a female USB connector. Alternatively, the first connector 15 is a female USB connector, and the second connector 16 is a male USB connector. Alternatively, the first connector 15 is a male PCIE connector, and the second connector 16 is a female PCIE connector. Alternatively, the first connector 15 is a female PCIE connector, and the second connector 16 is a male PCIE connector. There may be one or more disks 18. When there are multiple disks 18, the disks 18 may be all HDDs, all SSDs, or a mix of an HDD and an SSD. This is not limited in this application. The multiple disks 18 may form a RAID in a software manner. The second memory 19 is an NVM, and the second memory 19 may be a ROM, an EPROM, an EEPROM, or a flash memory. The second memory 19 stores the backup configuration information of the computing part 13. The computing mainboard 10 and the storage mainboard 17 are two separate mainboards. When the first connector 15 and the second connector 16 are interconnected, the processor system 12 is connected to the disk 18 using the first connector 15 and the second connector 16, and the BMC 14 is connected to the second memory 19 using the first connector 15 and the second connector 16. Referring to an implementation shown in FIG. 1, the processor system 12 is connected to a pin P1 of the first connector 15, the BMC 14 is connected to a pin P2 of the first connector 15, the disk 18 is connected to a pin P1 of the second connector 16, and the second memory 19 is connected to a pin P2 of the second connector 16. When the first connector 15 and the second connector 16 are interconnected, the pin P1 of the first connector 15 is connected to the pin P1 of the second connector 16, and the pin P2 of the first connector 15 is connected to the pin P2 of the second connector 16.

In a possible implementation, functions of the parts of the server are as follows.

The BMC 14 is configured to restore the configuration parameter of the computing part 13 according to the backup configuration information of the computing part 13 that is stored in the second memory 19 when the computing part 13 is replaced.

The processor system 12 is configured to copy, into the disk 18, the driver package of the computing part 13 that is stored in the first memory 11, and start from the disk 18 after the copy is completed.

In a possible implementation, functions of the parts of the server are as follows.

When the computing part 13 is replaced, the processor system 12 is configured to restore the configuration parameter of the computing part 13 according to the backup configuration information of the computing part 13 that is stored in the second memory 19, copy, into the disk 18, the driver package of the computing part 13 that is stored in the first memory 11, and start from the disk 18 after the copy is completed.

In a possible implementation, that the processor system 12 copies, into the disk 18, the driver package of the computing part 13 that is stored in the preset first memory 11 includes starting from the first memory 11, reading the driver package of the computing part 13 from the first memory 11 after the start, and copying the driver package of the computing part 13 into the disk 18.

In a possible implementation, functions of the parts of the server are as follows.

The BMC 14 is configured to determine whether the computing part 13 is updated, and determine whether the computing part 13 supports out-of-band configuration if the computing part 13 is updated. If the computing part 13 supports the out-of-band configuration, the BMC 14 reads the backup configuration information of the computing part 13 from the second memory 19, configures the computing part 13 according to the backup configuration information of the computing part 13, sets the first memory 11 as a first boot device, and restarts. The out-of-band configuration indicates a control manner in which a management channel is separated from a service channel. The management channel is used to transmit control data, and the service channel is used to transmit service data. The BMC 14 may obtain identity information of the computing part 13 according to a mapping relationship between prestored identity information and a status flag bit that indicates whether the out-of-band configuration is supported, and query an associated status flag bit according to the mapping relationship to determine whether the computing part 13 supports the out-of-band configuration.

In a possible implementation, before determining whether the computing part 13 is replaced, the BMC 14 may first determine whether the computing mainboard 10 is replaced, and if the computing mainboard 10 is replaced, then continue to determine whether the computing part 13 is replaced.

The processor system 12 is configured to restart from the first memory 11, read, after the restart, the driver package of the computing part 13 that is stored in the first memory 11, copy the driver package of the computing part 13 into the disk 18, and notify the BMC 14 after the copy is completed. The first memory 11 stores a thin operating system. The thin operating system provides only basic functions, and the thin operating system features a small size and low resource occupation. After restarting from the first memory 11, the processor system 12 runs the operating system, and copies the driver package of the computing part 13 in an operating system environment.

The BMC 14 is further configured to set the disk 18 as the first boot device, and restart when the copy of the driver package of the computing part 13 and the configuration of the computing part 13 are completed.

The processor system 12 is further configured to start from the disk 18, search, after the start, for the driver package of the computing part 13 that is stored in the disk 18, and drive the computing part 13 according to the driver package. In this embodiment, the storage component is not replaced, and the disk 18 stores an operating system of the server. After restarting from the disk 18, the processor system 12 runs the operating system of the server, and searches the disk 18 for the driver package of the computing part 13 and drives the computing part 13 according to the driver package of the computing part 13 when running the operating system.

In a possible implementation of this embodiment, the BMC 14 determines whether the computing part 13 is replaced, and if the computing part 13 is replaced, the BMC 14 reads the backup configuration information of the computing part 13 from the second memory 19, configures the computing part 13 according to the backup configuration information of the computing part 13, sets the first memory 11 as a first boot device, and restarts.

The processor system 12 is configured to start from the first memory 11, read, after the start, the driver package of the computing part 13 from the first memory 11, copy the driver package of the computing part 13 into the disk 18, read the backup configuration information of the computing part 13 from the first memory 11, and configure the computing part 13 according to the backup configuration information of the computing part 13.

The BMC 14 is further configured to set the disk 18 as the first boot device, and restart when the copy and the configuration are completed.

The processor system 12 is further configured to start from the disk 18, and drive, after the start, the computing part 13 according to the driver package of the computing part 13 that is stored in the disk 18. In some implementations of this embodiment, after the computing part 13 is replaced, the BMC 14 may further determine whether the computing part 13 supports out-of-band configuration, and perform a subsequent step when the computing part 13 does not support the out-of-band configuration.

In a possible implementation of this embodiment, the second memory 19 further stores backup identity information of the computing part 13 and backup identity information of the computing mainboard 10. The BMC 14 is configured to obtain identity information of the computing mainboard 10, read the backup identity information of the computing mainboard 10 from the second memory 19, determine whether the identity information of the computing mainboard 10 is the same as the read backup identity information of the computing mainboard 10, and determine that the computing mainboard 10 is replaced if the identity information is different from the read backup identity information. The computing mainboard 10 is a new computing mainboard. The BMC 14 obtains identity information of the computing part 13, reads the backup identity information of the computing part 13 from the second memory 19, and determines whether the identity information of the computing part 13 is the same as the read backup identity information of the computing part 13. The identity information includes but is not limited to one or more of model information, a serial number, or a MAC address. If the identity information is different from the read backup identity information, the BMC 14 determines that the computing part 13 is updated. The computing part 13 is a new computing part.

In a possible implementation of this embodiment, the BMC 14 is further configured to update, according to the identity information of the computing mainboard 10, the backup identity information of the computing mainboard 10 that is stored in the second memory 19 when the computing mainboard 10 is replaced, and update, according to the identity information of the computing part 13, the backup identity information of the computing part 13 that is stored in the second memory 19 when the computing part 13 is updated.

In a possible implementation, when configuration information of the computing part 13 is changed, the BMC 14 is further configured to update, according to configuration information after the change, the backup configuration information of the computing part 13 that is stored in the second memory 19.

In a possible implementation, the disk 18 further stores RAID configuration information. The processor system 12 is further configured to read the RAID configuration information stored in the disk 18, where the RAID configuration information indicates RAID modes of multiple disks in the disk 18, and configure the disk 18 according to the RAID configuration information. When the RAID configuration information is changed, the processor system 12 updates, according to RAID configuration information after the change, the RAID configuration information stored in the disk 18.

In a possible implementation, the second memory 19 further stores backup configuration information of the computing mainboard 10. When the computing mainboard 10 supports out-of-band configuration, the BMC 14 reads the backup configuration information of the computing mainboard 10 from the second memory 19, and correspondingly configures the computing mainboard 10 according to the backup configuration information of the computing mainboard 10. When configuration information of the computing mainboard 10 is changed, the BMC 14 updates, according to configuration information after the change, the backup configuration information of the computing mainboard 10 that is stored in the second memory 19.

In a possible implementation, the BMC 14 determines that the computing mainboard 10 is replaced, but the computing part 13 is not updated, that is, the identity information of the computing part 13 remains unchanged. In this case, only a configuration environment of the computing part 13 needs to be restored, and the driver package of the computing part 13 does not need to be updated. When the computing part 13 supports out-of-band configuration, the BMC 14 obtains the backup configuration information of the computing part from the second memory 19, and the processor system 12 starts from the disk 18 by default. After the start, the storage component is not replaced, the disk 18 stores the operating system and a driver package of a previous computing part, and identity information of the previous computing part is the same as that of the computing part 13. Therefore, the processor system 12 may directly drive the computing part 13 using the driver package of the previous computing part.

When the computing part 13 does not support the out-of-band configuration, the BMC 14 reads the backup configuration information of the computing part 13 from the second memory 19, and stores the read backup configuration information of the computing part 13 in the first memory 11. The processor system 12 obtains the backup configuration information of the computing part 13 from the first memory 11, and configures the computing part 13 according to the backup configuration information of the computing part 13. The processor system 12 directly starts from the disk 18. After the start, the processor system 12 reads the driver package of the computing part 13 from the disk 18, and drives the computing part 13.

In the foregoing embodiment, when the computing component of the server is replaced, the computing component is driven according to the driver package in the first memory 11, and the computing component is configured according to the backup configuration information of the computing part 13 that is prestored in the second memory 19 such that the server automatically recovers to a normal state. In this case, an operating system does not need to be reinstalled, and configuration information is restored quickly. This implements plug-and-play of the computing component, shortens a maintenance time for upgrading the server, and reduces a maintenance difficulty.

Figure 2:
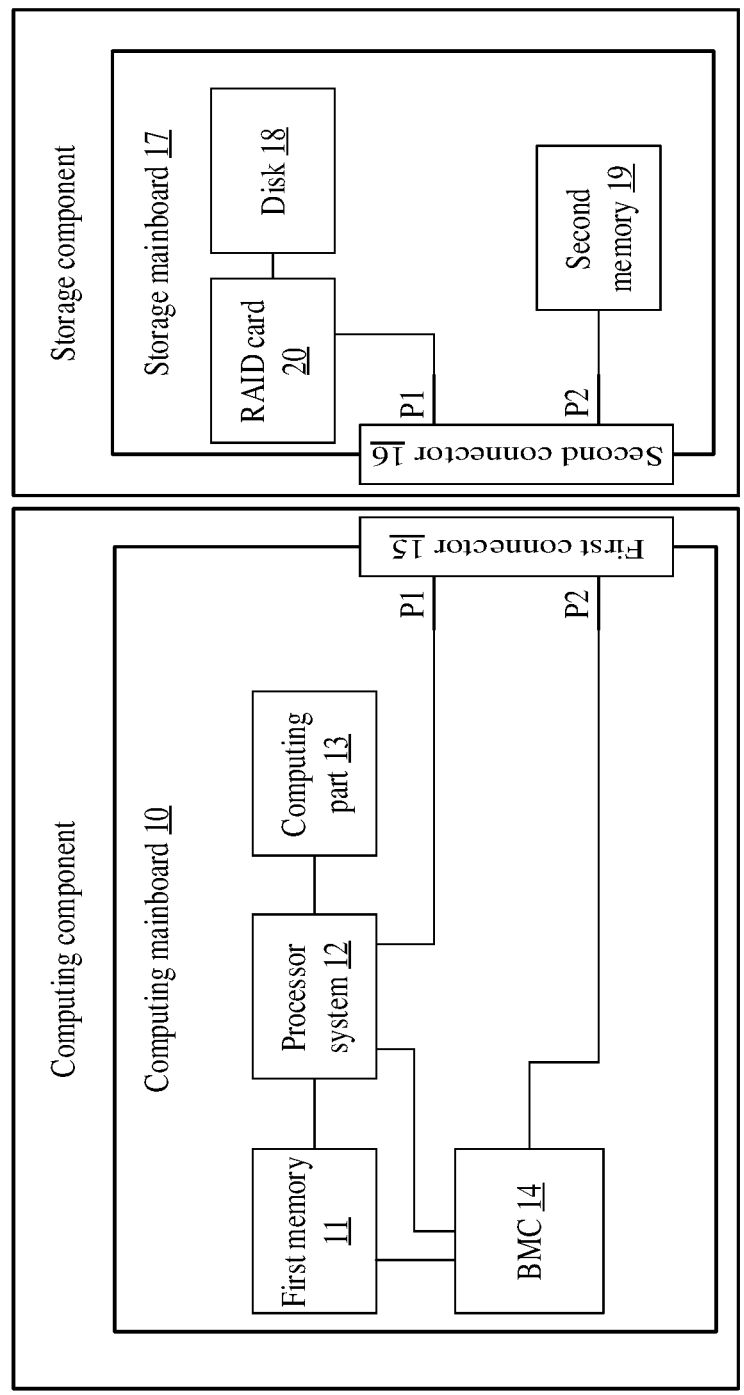
FIG. 2 is a schematic structural diagram of another server according to an embodiment of the present disclosure.

Referring to FIG. 2, FIG. 2 is a schematic structural diagram of another server according to an embodiment of the present disclosure. The server includes a computing component and a storage component. A difference between a structure of the server in FIG. 2 and the structure of the server in FIG. 1 merely lies in that the storage component herein includes a RAID card 20. The RAID card 20 is disposed on a storage mainboard 17. There are multiple disks 18, and the multiple disks 18 form a RAID using the RAID card 20. A processor system 12 is connected to the RAID card 20 using a first connector 15 and a second connector 16. When a computing mainboard 10 is replaced, the processor system 12 reads RAID configuration information from the RAID card 20, and correspondingly configures the disks 18 according to the RAID configuration information.

Figure 3A:
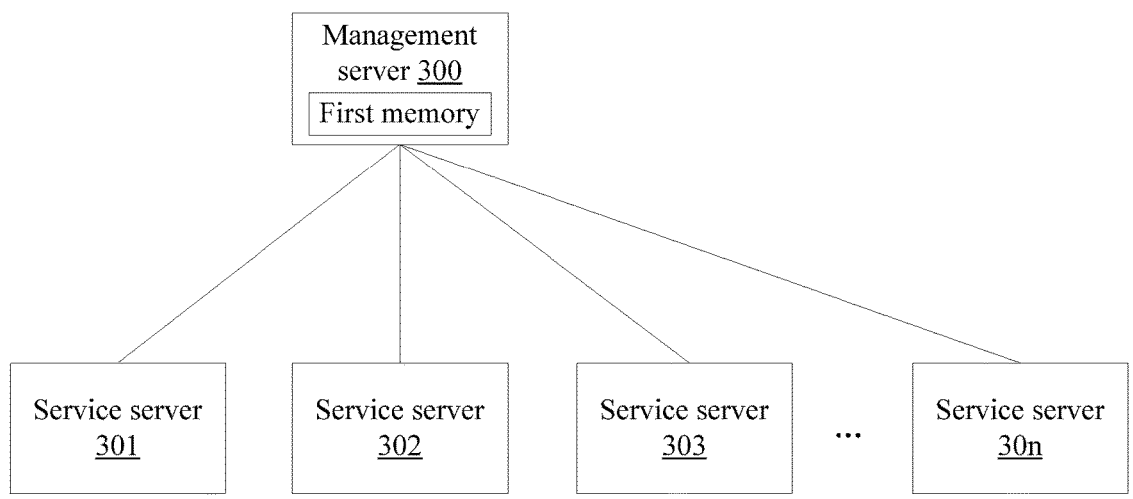
FIG. 3A is a schematic structural diagram of a service system according to an embodiment of the present disclosure.
Figure 3B:
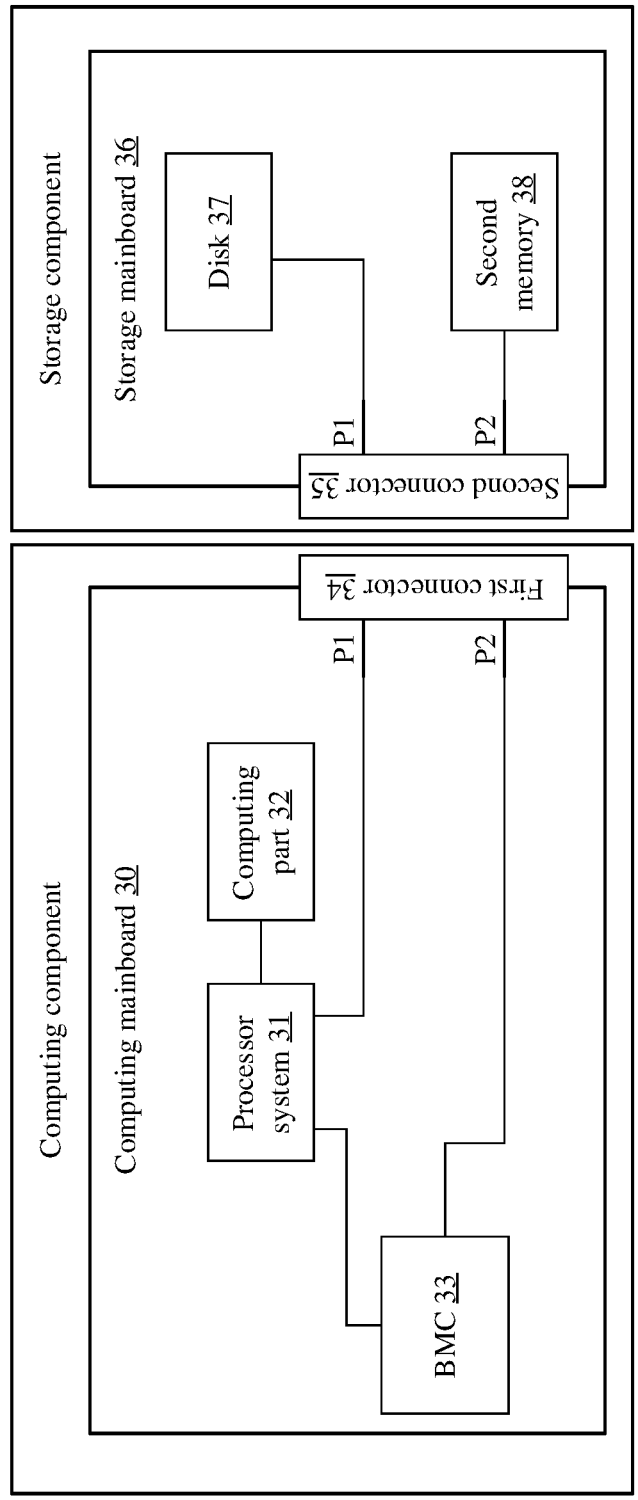
FIG. 3B is a schematic structural diagram of still another server according to an embodiment of the present disclosure.
Figure 3C:
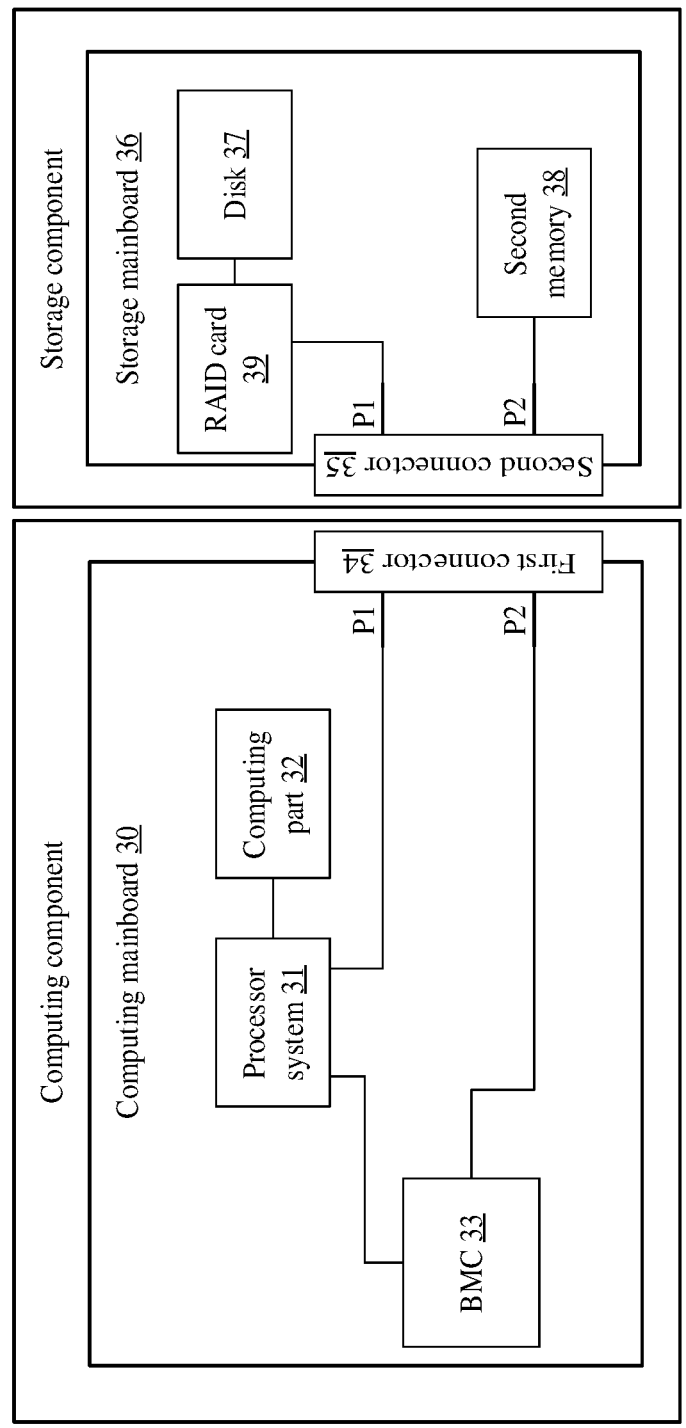
FIG. 3C is a schematic structural diagram of a yet another server according to an embodiment of the present disclosure.

Referring to FIG. 3A, FIG. 3A is a schematic structural diagram of a service system according to an embodiment of the present disclosure. In this embodiment of the present disclosure, the service system includes a management server 300 and multiple service servers 301 to 30*n*. The management server 300 is responsible for managing the multiple service servers 301 to 30*n*. The management server 300 includes a first memory, and the first memory stores a driver package of a computing part included in each of the service servers 301 to 30*n*. For repeated driver packages, only one driver package may be retained to reduce occupation of storage space. A structure of each service server 301 to 30*n* is shown in FIG. 3B and FIG. 3C. It should be noted that the structures of the multiple service servers 301 to 30*n* may all be the structure in FIG. 3B, the structure in FIG. 3C, or a mix of the two. This is not limited in this embodiment.

Referring to FIG. 3B, FIG. 3B is a schematic structural diagram of a service server in a service system. In this embodiment of the present disclosure, the service server includes a computing component and a storage component. The computing component includes a computing mainboard 30, a processor system 31, a computing part 32, a BMC 33, and a first connector 34. The processor system 31, the computing part 32, the BMC 33, and the first connector 34 are disposed on the computing mainboard 30. The processor system 31 is a processor network including one or more processors. Each processor may be a single-core processor or a multi-core processor. When the processor system 31 is a processor network including multiple processors, the processors communicate with each other using an interconnection channel. The interconnection channel may be QPI or HT. The computing part 32 is a part that performs a designated computation task. The computing part 32 includes but is not limited to a network adapter, an audio adapter, or a graphics processing card. The computing mainboard 30 is a carrier for all parts of the computing component. The processor system 31, the computing part 32, the BMC 33, and the first connector 34 are disposed on the computing mainboard 30. The first connector 34 is disposed on the computing mainboard 30. The processor system 31 is separately connected to the computing part 32, the first memory in the management server 300, the BMC 33, and the first connector 34. The BMC 33 is also connected to the first memory.

The storage component includes a second connector 35, a storage mainboard 36, a disk 37, and a second memory 38. The storage mainboard 36 is a carrier for all parts of the storage component. The second connector 35, the disk 37, and the second memory 38 are disposed on the storage mainboard 36. The storage mainboard 36 and the computing mainboard 30 are two separate mainboards. The second connector 35 and the first connector 34 match each other. There may be one or more disks 37. When there are multiple disks 37, the multiple disks 37 may be all HDDs, all SSDs, or a mix of an HDD and an SSD. This is not limited in this embodiment. The multiple disks 37 may form a RAID in a software manner. The second memory 38 is an NVM, and the second memory 38 includes but is not limited to a ROM, an EPROM, an EEPROM, or a flash memory. The second memory 38 stores backup configuration information of the computing part 32. The computing mainboard 30 and the storage mainboard 36 are two separate mainboards. When the first connector 34 and the second connector 35 are interconnected, the processor system 31 is connected to the disk 37 using the first connector 34 and the second connector 35, and the BMC 33 is connected to the second memory 38 using the first connector 34 and the second connector 35. For a specific connection manner, refer to the descriptions in FIG. 1. Details are not described herein again.

In a possible implementation, functions of the parts of the service server are as follows.

The BMC 33 is configured to restore a configuration parameter of the computing part 32 according to the backup configuration information of the computing part 32 that is stored in the second memory 38 when the computing part 32 is replaced.

The processor system 31 is configured to copy, into the disk 37, a driver package of the computing part 32 that is stored in the first memory in the management server 300, and start from the disk 37 after the copy is completed.

In a possible implementation, functions of the parts of the service server are as follows.

The processor system 31 is configured to restore a configuration parameter of the computing part 32 according to the backup configuration information of the computing part 32 that is stored in the second memory 38, copy, into the disk 37, a driver package of the computing part 32 that is stored in the first memory in the management server 300, and start from the disk 37 after the copy is completed when the computing part 32 is replaced.

In a possible implementation, that the processor system 31 copies, into the disk 37, the driver package of the computing part 32 that is stored in the preset first memory includes starting from the first memory in the management server 300, reading the driver package of the computing part 32 from the first memory after the start, and copying the driver package of the computing part 32 into the disk 37.

In a possible implementation, functions of the parts of the service server are as follows. The BMC 33 is configured to determine whether the computing part 32 is updated, and determine whether the computing part 32 supports out-of-band configuration if the computing part 32 is updated. If the computing part 32 supports the out-of-band configuration, the BMC 33 obtains the backup configuration information of the computing part 32 from the second memory 38, and restores a configuration environment of the computing part 32 according to the backup configuration information of the computing part 32. The BMC 33 sets the associated first memory in the management server 300 as a first boot device, and restarts. In a possible implementation, before determining whether the computing part 32 is replaced, the BMC 33 may further determine whether the computing mainboard 30 is replaced, and continue to determine whether the computing part 32 is replaced if the computing mainboard 30 is replaced.

The processor system 31 is configured to restart from the first memory in the management server 300, read, after the restart, the driver package of the computing part 32 that is stored in the first memory, copy the driver package of the computing part 32 into the disk 37, and notify the BMC 33 after the copy is completed.

The BMC 33 is further configured to set the disk 37 as the first boot device, and restart when the copy of the driver package of the computing part 32 is completed.

The processor system 31 is further configured to restart from the disk 37, search, after the restart, for the driver package of the computing part 32 that is stored in the disk 37, and drive the computing part 32 according to the driver package.

In a possible implementation of this embodiment, the BMC 33 determines whether the computing part 32 is replaced, reads the backup configuration information of the computing part 32 from the second memory 38, configures the computing part 32 according to the backup configuration information of the computing part 32, sets the first memory as a first boot device, and restarts.

The processor system 31 is configured to restart from the first memory, read the driver package of the computing part 32 from the first memory after the restart, copy the driver package of the computing part 32 into the disk 37, read the backup configuration information of the computing part 32 from the first memory, and configure the computing part 32 according to the backup configuration information of the computing part 32.

The BMC 33 is further configured to set the disk 37 as the first boot device, and restart when the copy and the configuration are completed.

The processor system 31 is further configured to restart from the disk 37, and drive, after the restart, the computing part 32 according to the driver package of the computing part 32 that is stored in the disk 37. In some implementations of this embodiment, after determining that the computing part 32 is replaced, the BMC 33 may further determine whether the computing part 32 supports out-of-band configuration, and perform a subsequent step when the computing part 32 does not support the out-of-band configuration.

In a possible implementation of this embodiment, the second memory 38 further stores backup identity information of the computing part 32 and backup identity information of the computing mainboard 30. The BMC 33 is configured to obtain identity information of the computing mainboard 30, read the backup identity information of the computing mainboard 30 from the second memory 38, determine whether the identity information of the computing mainboard 30 is the same as the read backup identity information of the computing mainboard 30, and if the identity information is different from the read backup identity information, determine that the computing mainboard 30 is replaced. The computing mainboard 30 is a new computing mainboard. The BMC 33 obtains identity information of the computing part 32, obtains the backup identity information of the computing part 32 from the second memory 38, determines whether the identity information of the computing part 32 is the same as the read backup identity information of the computing part 32, and if the identity information is different from the read backup identity information, determines that the computing part 32 is updated. The computing part 32 is a new computing part.

In a possible implementation of this embodiment, the BMC 33 is further configured to update, according to the identity information of the computing mainboard 30, the backup identity information of the computing mainboard 30 that is stored in the second memory 38 when the computing mainboard 30 is replaced, and update, according to the identity information of the computing part 32, the backup identity information of the computing part 32 that is stored in the second memory 38 when the computing part 32 is updated.

In a possible implementation, when configuration information of the computing part 32 is changed, the BMC 33 is further configured to update, according to configuration information after the change, the backup configuration information of the computing part 32 that is stored in the second memory 38.

In a possible implementation, the disk 37 further stores RAID configuration information. The processor system 31 is further configured to read the RAID configuration information stored in the disk 37, where the RAID configuration information indicates RAID modes of multiple disks in the disk 37, and configure the disk 37 according to the RAID configuration information. When the RAID configuration information is changed, the processor system 31 updates, according to RAID configuration information after the change, the RAID configuration information stored in the second memory 38.

In a possible implementation, the second memory 38 further stores backup configuration information of the computing mainboard 30. When the computing mainboard 30 supports out-of-band configuration, the BMC 33 reads the backup configuration information of the computing mainboard 30 from the second memory 38, and correspondingly configures the computing mainboard 30 according to the backup configuration information of the computing mainboard 30. When configuration information of the computing mainboard 30 is changed, the BMC 33 or the processor system 31 updates, according to configuration information after the change, the backup configuration information of the computing mainboard 30 that is stored in the second memory 38.

Referring to FIG. 3C, FIG. 3C is another schematic structural diagram of a service server in a service system. A difference between a structure of the service server in this embodiment of the present disclosure and that of the service server in FIG. 3B merely lies in that a storage component herein further includes a RAID card 39. The RAID card 39 is disposed on a storage mainboard 36, and the RAID card 39 is connected to a disk 37. A processor system 31 is connected to the RAID card 39 using a first connector 34 and a second connector 35. There are multiple disks 37, and the multiple disks 37 form a RAID in a hardware manner using the RAID card 39. When a computing mainboard 30 is replaced, the processor system 31 reads RAID configuration information stored in the RAID card 39, and correspondingly configures the disks 37 according to the RAID configuration information.

In the foregoing embodiment, when the computing component of the server is replaced, the computing component is driven according to the driver package in the first memory, and the server is configured according to the backup configuration information prestored in the second memory 38 such that the server automatically recovers to a normal state. In this case, an operating system does not need to be reinstalled, and configuration information is restored quickly. This implements plug-and-play of the computing component, shortens a maintenance time for upgrading the server, and reduces a maintenance difficulty. In addition, driver packages of computing parts in all servers are stored in the first memory together. This can effectively reduce storage space occupied by the driver packages.

Figure 4:
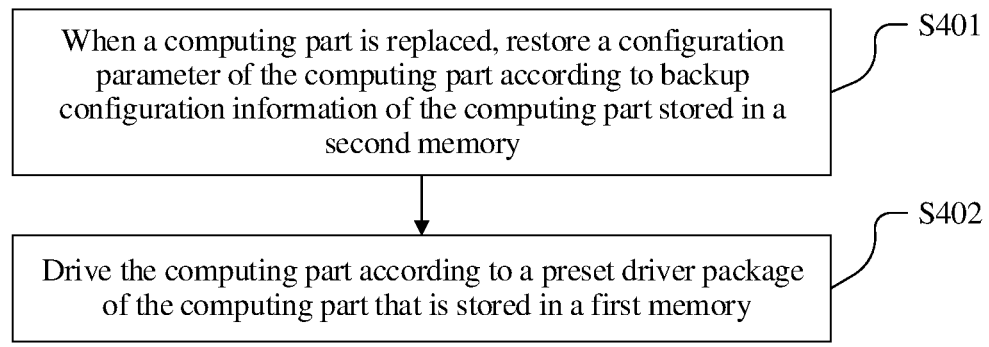
FIG. 4 is a schematic flowchart of a server management method according to an embodiment of the present disclosure.

Referring to FIG. 4, FIG. 4 is a schematic flowchart of a server management method according to an embodiment of the present disclosure. In this embodiment of the present disclosure, the method includes the following steps.

Step S401: When a computing part is replaced, restore a configuration parameter of the computing part according to backup configuration information of the computing part stored in a second memory.

Further, a server includes a computing component and a storage component. The computing component is primarily configured to perform computation functions such as data packet processing, image processing, and voice processing. The storage component is primarily configured to store a large amount of data. The storage component includes a disk, and there may be one or more disks. Multiple disks may form a RAID. The RAID may be implemented in a hardware manner or in a software manner. If the RAID is implemented in a hardware manner, the storage component further includes a RAID card. The computing component and the storage component are connected in a detachable manner such that the computing component and the storage component are removed and inserted. When the computing component or the storage component needs to be upgraded or becomes faulty, the entire computing component or storage component may be replaced. The second memory prestores backup configuration information. The backup configuration information includes but is not limited to backup configuration information of a network adapter, backup configuration information of a graphics card, and backup RAID level information. The server reads the backup configuration information prestored in the second memory, and the server is configured according to the backup configuration information.

Step S402: Drive the computing part according to a preset driver package of the computing part that is stored in a first memory.

Further, when the computing part is replaced, the server obtains the driver package of the computing part. If the computing component includes a network adapter, the driver package of the computing part includes a driver package of the network adapter. The driver package of the computing part may be stored in the first memory. The first memory may be located in the computing component, or may be located in a management server outside the server. The management server is configured to manage all servers together.

By implementing the foregoing embodiment, when the computing part of the server is replaced, the computing component is driven according to the driver package in the first memory, and the server is configured according to the backup configuration information prestored in the second memory such that the server automatically recovers to a normal state. In this case, an operating system does not need to be reinstalled, and configuration information is restored quickly. This implements plug-and-play of the computing component, shortens a maintenance time for upgrading the server, and reduces a maintenance difficulty.

Figure 5:
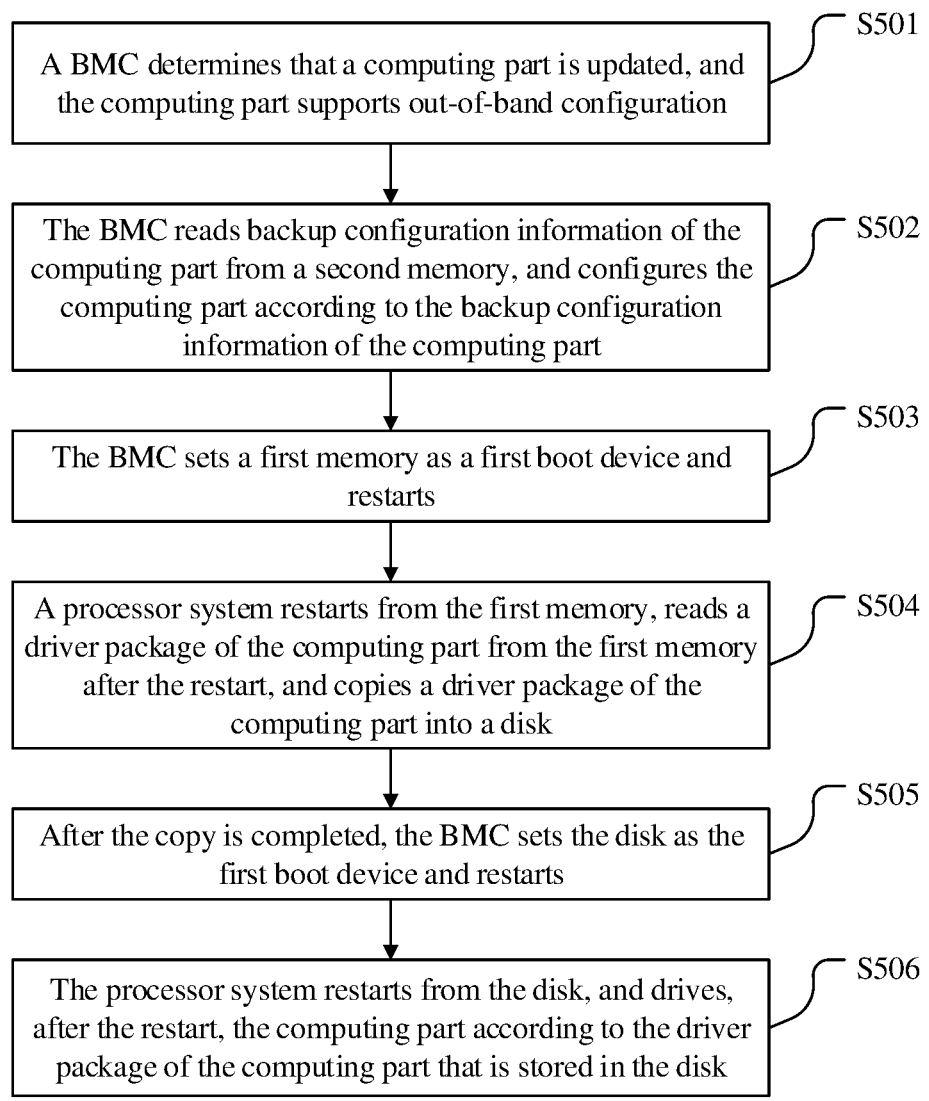
FIG. 5 is a schematic flowchart of another server management method according to an embodiment of the present disclosure.

Referring to FIG. 5, FIG. 5 is another schematic flowchart of a server management method according to an embodiment of the present disclosure. In this embodiment of the present disclosure, the method includes the following steps.

Step S501: A BMC determines that a computing part is updated and the computing part supports out-of-band configuration.

A server in this embodiment includes a computing component and a storage component. The computing component includes the BMC, a processor system, the computing part, a computing mainboard, and a first connector. The BMC is a controller for monitoring and managing all hardware on the server, and the BMC may communicate with all the hardware in an out-of-band manner using an Intelligent Platform Management Interface (IPMI), a Universal Asynchronous Receiver/Transmitter (UART) interface, or an interface of another type. The processor system is a processor network including one or more processors. Each processor may be a single-core processor or a multi-core processor. Any two processors may communicate with each other using a QPI channel or an HT channel. The computing part is hardware that performs a designated task, for example, to perform tasks such as data packet processing, voice processing, or graphic processing. The computing part may be a network adapter, an audio adapter, a MEZZ card, a graphics card, or a part of another type. The first connector is a pluggable connector. The first connector and a second connector match each other such that the computing component and the storage component can be connected in a detachable manner. In the computing component, the processor system is separately connected to the BMC, the computing part, and the first connector. A connection bus includes but is not limited to a PCIE bus, a USB bus, a SATA bus, or a Serial Attached Small Computer System Interface (SCSI) (SAS) bus. The processor system, the BMC, the computing part, and the first connector may all be disposed on the computing mainboard.

The storage component includes a disk, a second memory, and the second connector. There may be one or more disks, and the disks include but are not limited to SSDs or HDDs. The multiple disks may form a RAID in a software manner.

The second memory is an NVM and features no data loss during a power failure. The second memory includes but is not limited to a ROM, an EPROM, an EEPROM, or a flash memory. The second memory stores backup configuration information of the computing part. It should be noted that the second memory further stores a thin operating system. The thin operating system provides only basic functions and features a small size and low resource occupation, and the thin operating system includes but is not limited to a LINUX operating system, a UNIX operating system, or a WINDOWS PE operating system. The second connector is a pluggable connector. The first connector and the second connector match each other. In a possible implementation, the first connector and the second connector may be USB connectors, SATA connectors, PCIE connectors, or connectors of another type. This is not limited in this embodiment. When the first connector and the second connector are interconnected, pins corresponding to the first connector and the second connector are connected because of contact, the BMC is connected to the second memory using the first connector and the second connector, and the processor system is connected to the disk using the first connector and the second connector.

The BMC determines whether the computing mainboard is replaced, if the computing mainboard is replaced, continues to determine whether the computing part is updated, and if the computing part is updated, continues to determine whether the computing part supports out-of-band configuration. The out-of-band configuration indicates that configuration is performed using a channel other than a service channel, and an operating system does not need to be started. If the computing part supports the out-of-band configuration, step S502 is performed.

In a possible implementation, the BMC determines whether the computing part is replaced, if the computing part is replaced, reads the backup configuration information of the computing part that is stored in the second memory, stores the backup configuration information of the computing part in a first memory, sets the first memory as a first boot device, and restarts. The processor system restarts from the first memory. The first memory stores a driver package of the computing part, a thin operating system, and management software. After the restart, the processor system runs the management software in the thin operating system, and the management software reads the driver package of the computing part from the first memory, copies the driver package of the computing part into the disk, reads the backup configuration information of the computing part from the first memory, and configures the computing part according to the backup configuration information of the computing part. When the copy and the configuration are completed, the BMC sets the disk as the first boot device and restarts. The processor system restarts from the disk, and drives, after the restart, the computing part according to the driver package of the computing part that is stored in the disk.

Step S502: The BMC reads backup configuration information of the computing part from a second memory, and configures the computing part according to the backup configuration information of the computing part.

The backup configuration information of the computing part indicates configuration information of the computing part in the server before the computing mainboard is replaced. For example, when the computing part is a network adapter, the backup configuration information of the computing part includes but is not limited to one or more of a MAC address, an IP address, a World Wide Name (WWN), a World Wide Port Name (WWPN), or a universally unique identifier (UUID). The BMC reads the backup configuration information of the computing part from the second memory, and restores previous configuration of the computing part according to the backup configuration information of the computing part.

Step S503: The BMC sets a first memory as a first boot device and restarts.

The first memory is a non-volatile memory, and the first memory includes but is not limited to a ROM, an EPROM, an EEPROM, or a flash memory. In a possible implementation, the first memory may be located in the computing component, and the processor system is connected to the first memory. In another possible implementation, the first memory is located outside the server and inside a management server that manages the server, and the processor system is connected to the first memory. The BMC sets the first memory as the first boot device. The first boot device indicates a storage device first accessed by the server upon start.

Step S504: A processor system restarts from the first memory, reads a driver package of the computing part from the first memory after the restart, and copies the driver package of the computing part into a disk.

The processor system restarts from the first memory. The first memory stores the thin operating system and the management software. The processor system runs the management software in the thin operating system. The management software reads the driver package of the computing part from the first memory in an operating system environment, and copies the driver package of the computing part into the disk. After the copy operation of the driver package of the computing part is completed, the processor system sends a copy complete message to the BMC.

Step S505: After the copy is completed, the BMC sets the disk as the first boot device and restarts.

When the copy of the driver package of the computing part is completed, the BMC sets the disk as the first boot device. When there are multiple disks, the BMC sets a disk with an active partition as the first boot device, and restarts after the setting is completed.

Step S506: The processor system restarts from the disk, and drives, after the restart, the computing part according to the driver package of the computing part that is stored in the disk.

In this embodiment of the present disclosure, the storage component is not replaced. Therefore, the disk stores an operating system of the server. After restarting from the disk, the processor system runs the operating system in the disk. In this case, the operating system is an operating system that is installed on the server and that has a complete function. The processor system searches the disk for the driver package of the computing part, and drives the computing part according to the driver package of the computing part.

In the foregoing embodiment, when the computing part of the server is replaced, the computing component is driven according to the driver package in the first memory, and the server is configured according to the backup configuration information prestored in the second memory such that the server automatically recovers to a normal state. In this case, an operating system does not need to be reinstalled, and configuration information is restored quickly. This implements plug-and-play of the computing component, shortens a maintenance time for upgrading the server, and reduces a maintenance difficulty.

Figure 6A:
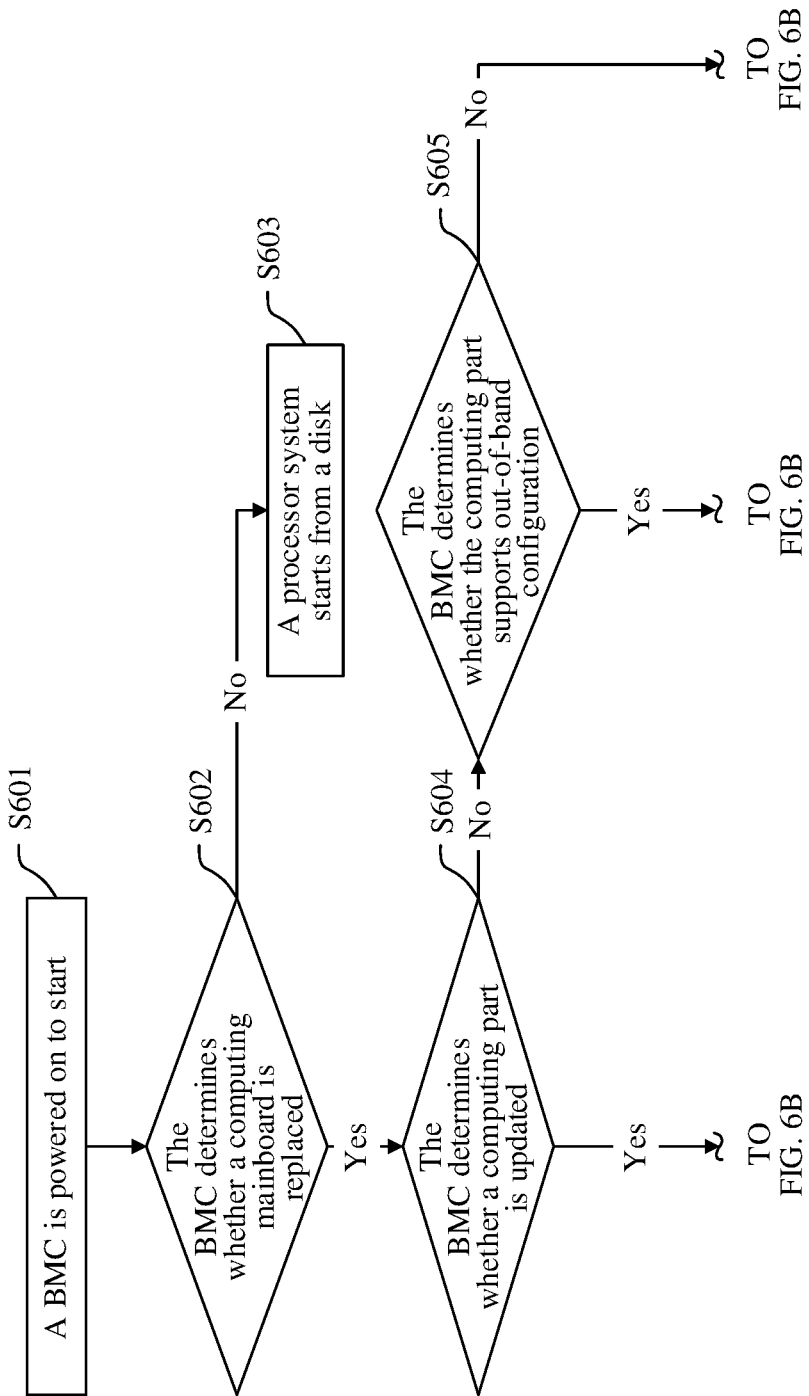
FIG. 6A and FIG. 6B are schematic flowcharts of still another server management method according to an embodiment of the present disclosure.
Figure 6B:
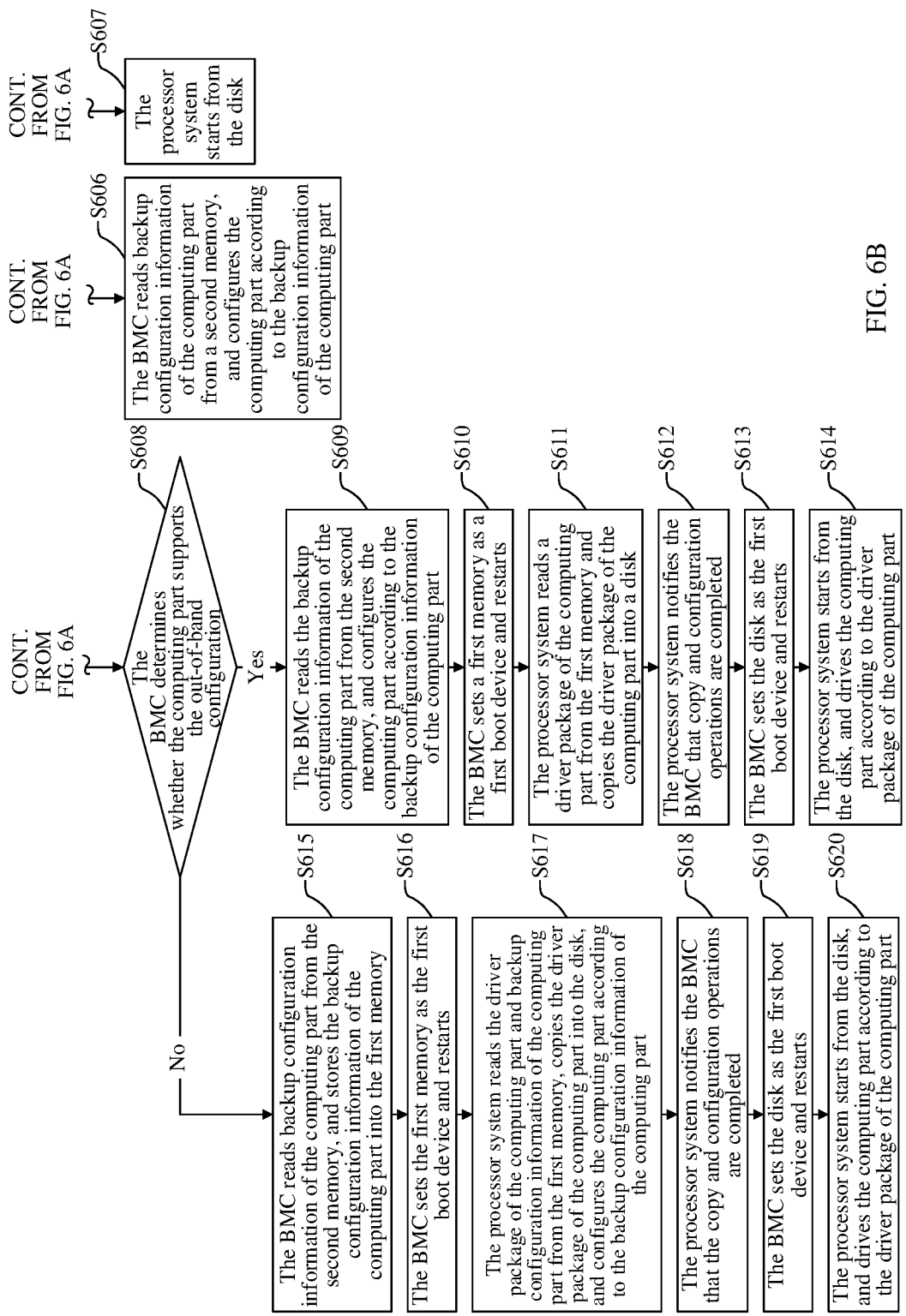

Referring to FIG. 6A and FIG. 6B, FIG. 6A and FIG. 6B are another schematic flowchart of a server management method according to an embodiment of the present disclosure. In this embodiment of the present disclosure, the method includes the following steps.

Step S601: A BMC is powered on to start.

The BMC is configured to monitor and manage all hardware on a server. The BMC may communicate with all the hardware in an out-of-band manner using an IPMI interface, and does not need to use an operating system. After being powered on to start, the BMC performs step S602.

Step S602: The BMC determines whether a computing mainboard is replaced.

Further, the server in this embodiment includes a computing component and a storage component, and the computing component includes a BMC, a processor system, a computing part, a computing mainboard, and a first connector. The processor system is a processor network including one or more processors. Each processor may be a single-core processor or multi-core processors. Any two processors may communicate with each other using a QPI channel or an HT channel. The computing part is hardware that performs a designated task. The computing part includes but is not limited to a network adapter, a MEZZ card, an audio adapter, a graphics card, or a part of another type. The first connector is a pluggable connector, and the first connector and a second connector match each other such that the computing component and the storage component can be connected in a detachable manner. In the computing component, the processor system is separately connected to the BMC, the computing part, and the first connector. A connection bus includes but is not limited to a PCIE bus, a USB bus, a SATA bus, or a SAS bus. The computing mainboard is a carrier for all parts of the computing component. The processor system, the BMC, the computing part, and the first connector may all be disposed on the computing mainboard.

The storage component includes a disk, a second memory, and the second connector. There may be one or more disks, and the disks include but are not limited to SSDs or HDDs. The multiple disks may form a RAID in a software manner. The second memory is a non-volatile memory, and includes but is not limited to a ROM, a PROM, an EPROM, an EEPROM, or a flash memory. The second memory stores backup identity information of the computing mainboard, backup identity information of the computing part, and backup configuration information of the computing part. It should be noted that the second memory further stores a thin operating system. The thin operating system provides only basic functions and features a small size and low resource occupation, and the thin operating system includes but is not limited to a LINUX operating system, a UNIX operating system, a WINDOWS PE operating system, or another operating system. The second connector is a pluggable connector. The second connector and the first connector match each other. For example, the first connector and the second connector are USB connectors, SATA connectors, PCIE connectors, or connectors of another type. This is not limited in this embodiment. When the first connector and the second connector are interconnected, pins corresponding to the first connector and the second connector are connected because of contact, the BMC is connected to the second memory using the first connector and the second connector, and the processor system is connected to the disk using the first connector and the second connector.

A method for determining, by the BMC, whether the computing mainboard is replaced may be as follows. The BMC obtains identity information of the computing mainboard, obtains the backup identity information of the computing mainboard from the second memory, and determines whether the identity information of the computing mainboard is the same as the backup identity information of the computing mainboard. If the identity information is the same as the backup identity information, the BMC determines that the computing mainboard is not replaced, and step S603 is performed. If the identity information is different from the backup identity information, the BMC determines that the computing mainboard is replaced, and performs step S604.

It should be noted that, when the computing mainboard is replaced, the BMC updates, according to the identity information of the computing mainboard, the backup identity information of the computing mainboard that is stored in the second memory, and overwrites the backup identity information of the computing mainboard that is stored in the second memory with the identity information of the computing mainboard.

Step S603: A processor system starts from a disk.

The computing mainboard is not replaced. The computing mainboard is the carrier for all the parts of the computing component. A default first boot device of the server is the disk, and the processor system starts from the disk. The disk stores an operating system and configuration information of all the parts, and the server runs normally.

Step S604: The BMC determines whether a computing part is updated.

A method for determining, by the BMC, whether the computing part is updated may be as follows. The BMC obtains identity information of the computing part, obtains the backup identity information of the computing part from the second memory, and compares the identity information of the computing part with the backup identify information of the computing part. If the identity information is different from the backup identity information, the BMC determines that the computing part is updated, and performs step S608. If the identity information is the same as the backup identity information, the BMC determines that the computing part is not updated, and performs step S605.

It should be noted that, when the computing part is updated, the BMC obtains the identity information of the computing part, updates, according to the identity information of the computing part, the backup identity information of the computing part that is stored in the second memory, and overwrites the backup identity information of the computing part that is stored in the second memory with the identity information of the computing part.

Step S605: The BMC determines whether the computing part supports out-of-band configuration.

The computing component prestores a mapping relationship between identity information and a status flag bit. The identity information indicates the identity information of the computing part, and the status flag bit indicates whether the out-of-band configuration is supported. For example, 0 indicates that the out-of-band configuration is not supported, and 1 indicates that the out-of-band configuration is supported. The computing component obtains the identity information of the computing part, and queries a corresponding status flag bit according to the mapping relationship to determine whether the out-of-band configuration is supported. If the out-of-band configuration is supported, step S606 is performed, otherwise, step S607 is performed.

Step S606: The BMC reads backup configuration information of the computing part from a second memory, and configures the computing part according to the backup configuration information of the computing part.

The BMC reads the backup configuration information of the computing part from the second memory, and configures the computing part according to the backup configuration information of the computing part. The BMC may detect whether the first boot device is the disk, if the first boot device is not the disk, set the first boot device as the disk, and if the first boot device is the disk, perform step S607.

Step S607: The processor system starts from the disk.

The storage component is not updated. The disk stores the operating system. After starting from the disk, the processor system runs the operating system. Because the identity information of the computing part remains unchanged, a driver package of a previous computing part that is stored in the disk is still valid, and the processor system drives the computing part according to the previous driver package.

Step S608: The BMC determines whether the computing part supports the out-of-band configuration.

For a specific process, refer to the descriptions in step S605. Details are not described herein again. If the computing part supports the out-of-band configuration, step S609 is performed.

Step S609: The BMC reads the backup configuration information of the computing part from the second memory, and configures the computing part according to the backup configuration information of the computing part.

For example, when the computing part is a network adapter, the backup configuration information of the computing part includes but is not limited to one or more of a MAC address, an IP address, a UUID, a WWN, or a WWPN.

In a possible implementation, when configuration information of the computing mainboard is changed, the BMC updates, according to configuration information after the change, the backup configuration information of the computing mainboard that is stored in the second memory.

When configuration information of the computing part is changed, the BMC updates, according to configuration information after the change, the backup configuration information of the computing part that is stored in the second memory.

Step S610: The BMC sets a first memory as a first boot device and restarts.

The first memory may be located in the computing part of the server, or may be located in a management server outside the server.

Step S611: The processor system reads a driver package of the computing part from the first memory and copies the driver package of the computing part into the disk.

The processor system restarts from the first memory and the first memory stores a thin operating system. The processor system runs the thin operating system, reads the driver package of the computing part from the first memory in an operating system environment, and copies the driver package of the computing part into the disk. After the copy operation of the driver package of the computing part is completed, the processor system sends a notification message to the BMC.

Step S612: The processor system notifies the BMC that copy and configuration operations are completed.

Further, after determining that the copy operation of the driver package of the computing part and the configuration operation of the computing part by the BMC are completed, the processor system sends the notification message to the BMC.

Step S613: The BMC sets the disk as the first boot device and restarts.

After receiving the notification message sent by the processor system to determine that the copy of the driver package of the computing part is completed, and the configuration of the computing part is completed, the BMC sets the disk as the first boot device. When there are multiple disks, the BMC sets a disk with an active partition as the first boot device, and restarts after the setting is completed.

Step S614: The processor system starts from the disk, and drives the computing part according to the driver package of the computing part.

In this embodiment of the present disclosure, the storage component is not replaced. Therefore, the disk stores an operating system of the server. After starting from the disk, the processor system runs the operating system in the disk. In this case, the operating system is an operating system that is installed on the server and that has a complete function. The processor system searches the disk for the driver package of the computing part, and drives the computing part according to the driver package of the computing part.

Step S615: The BMC reads backup configuration information of the computing part from the second memory, and stores the backup configuration information of the computing part in the first memory.

When a determining result of step S608 is no, the BMC reads the backup configuration information of the computing part from the second memory, and stores the backup configuration information of the computing part in the first memory.

Step S616: The BMC sets the first memory as the first boot device and restarts.

Step S617: The processor system reads the driver package of the computing part and backup configuration information of the computing part from the first memory, copies the driver package of the computing part into the disk, and configures the computing part according to the backup configuration information of the computing part.

The processor system restarts from the first memory. The first memory stores the driver package of the computing part, a thin operating system, and management software. After the restart, the processor system runs the management software in the thin operating system, and the management software reads the driver package of the computing part from the first memory, copies the driver package of the computing part into the disk, reads the backup configuration information of the computing part from the first memory, and configures the computing part according to the backup configuration information of the computing part.

Step S618: The processor system notifies the BMC that the copy and configuration operations are completed.

Step S619: The BMC sets the disk as the first boot device and restarts.

Step S620: The processor system starts from the disk, and drives the computing part according to the driver package of the computing part.

In a possible implementation, when a determining result of step S604 is yes, whether the computing part supports the out-of-band configuration does not need to be determined, and steps S615 to S620 are directly performed.

In a possible implementation, the disk further stores RAID configuration information, and the method further includes reading, by the processor system, the RAID configuration information from the disk, and configuring the disk according to the RAID configuration information.

There are multiple disks in the storage component, and the multiple disks form a RAID in a software manner. When the computing mainboard is replaced, the processor system reads the RAID configuration information stored in the second memory, and configures the disks according to the RAID configuration information.

In a possible implementation, the storage component further includes a RAID card. The RAID card is connected to the disks, and the RAID card is connected to the processor system using the second connector and the first connector.

The server management method further includes reading, by the processor system, RAID configuration information from the RAID card, and configuring the disk according to the RAID configuration information.

Further, there are multiple disks in the storage component, and the multiple disks form a RAID in a hardware manner. When the computing mainboard is replaced, the processor system reads the RAID configuration information stored in the RAID card, and configures the disks according to the RAID configuration information.

In conclusion, when the computing part of the server is replaced, the computing component is driven according to the driver package in the first memory, and the server is configured according to the backup configuration information prestored in the second memory such that the server automatically recovers to a normal state. In this case, an operating system does not need to be reinstalled, and configuration information is restored quickly. This implements plug-and-play of the computing component, shortens a maintenance time for upgrading the server, and reduces a maintenance difficulty.

A person of ordinary skill in the art may understand that all or some of the processes of the methods in the embodiments may be implemented by a computer program instructing relevant hardware. The program may be stored in a computer readable storage medium. When the program runs, the processes of the foregoing method embodiments may be performed. The foregoing storage medium includes any medium that can store program code, such as a ROM, a random access memory (RAM), a magnetic disk, or an optical disc.

The foregoing embodiments are merely optional embodiments of the present disclosure, and are not intended to limit the scope of the claims of the present disclosure. A person of ordinary skill in the art may understand that all or some of the processes that implement the foregoing embodiments and equivalent modifications that are made in accordance with the claims of the present disclosure shall fall within the scope of the present disclosure.

What is claimed is:
1. A server, comprising:
   a computing component comprising:
      a computing mainboard;
      a baseboard management controller (BMC) coupled to the computing mainboard;
      a computing part coupled to the computing mainboard;
      a first connector coupled to the computing mainboard;
      a processor system coupled to the computing mainboard and separately coupled to the BMC, the computing part, and the first connector; and
   a storage component comprising:
      a storage mainboard;
      a second connector coupled to the storage mainboard and matched to the first connector;
      a disk coupled to the storage mainboard and the second connector; and
      a second memory coupled to the storage mainboard and the second connector, wherein the second memory stores backup configuration information and backup identity information of the computing part, and wherein the backup configuration information of the computing part restores a configuration parameter of the computing part, wherein the BMC is coupled to the second memory using the first connector and the second connector when the first connector and the second connector are intercoupled,
   wherein the processor system is coupled to the disk using the first connector and the second connector when the first connector and the second connector are intercoupled, and
   wherein the BMC is configured to:
      obtain identity information of the computing part;
      obtain the backup identity information of the computing part from the second memory;
      determine whether the identity information of the computing part is the same as the backup identity information of the computing part; and
      determine that the computing part is updated when the identity information of the computing part is different from the backup identity information of the computing port.

2. The server of claim 1, wherein the BMC is configured to restore the configuration parameter of the computing part according to the backup configuration information of the computing part stored in the second memory when the computing part is replaced, and wherein the processor system is configured to:
   copy, into the disk, a preset driver package of the computing part stored in a first memory; and
   start from the disk after copying is completed.

3. The server of claim 1, wherein when the computing part is replaced, the processor system is configured to:
   restore the configuration parameter of the computing part according to the backup configuration information of the computing part stored in the second memory;
   copy, into the disk, a preset driver package of the computing part stored in a first memory; and
   start from the disk after copying is completed.

4. The server of claim 2, wherein when copying the preset driver package of the computing part, the processor system is further configured to:
   start from the first memory;
   read the preset driver package of the computing part from the first memory after starting; and
   copy the preset driver package of the computing part into the disk.

5. The server of claim 3, wherein when copying the preset driver package of the computing part, the processor system is further configured to:
   start from the first memory;
   read the preset driver package of the computing part from the first memory after starting; and
   copy the preset driver package of the computing part into the disk.

6. The server of claim 4, wherein the computing component further comprises the first memory, wherein a driver package of the computing component drives the computing component, wherein the BMC is coupled to the first memory, and wherein the processor system is coupled to the first memory.

7. The server of claim 4, wherein the first memory is located in a management server associated with the server, wherein the BMC is coupled to the first memory, and wherein the processor system is coupled to the first memory.

8. The server of claim 1, wherein the BMC is further configured to update, according to the identity information of the computing part, the backup identity information of the computing part stored in the second memory when the computing part is updated.

9. The server of claim 1, wherein when configuration information of the computing part is changed, the BMC is configured to update, according to the changed configuration information, the backup configuration information of the computing part stored in the second memory.

10. The server of claim 1, wherein the storage component further comprises a Redundant Array of Independent Disk (RAID) card, wherein the RAID card is coupled to the storage mainboard, wherein the processor system is coupled to the RAID card using the first connector and the second connector, and wherein the processor system is further configured to:
   read RAID configuration information from the RAID card; and
   configure the disk according to the RAID configuration information.

11. A server management method, wherein the server management method is applied to a server, and wherein the server management method comprises:
   restoring a configuration parameter of a computing part according to backup configuration information of the computing part stored in a second memory when the computing part is replaced; and
   driving the computing part according to a preset driver package of the computing part stored in a first memory,
   wherein the server comprises a computing component and a storage component,
   wherein the computing component comprises a baseboard management controller (BMC), a processor system, a computing mainboard, the computing part, and a first connector,
   wherein the BMC, the processor system, the computing part, and the first connector are coupled to the computing mainboard,
   wherein the processor system is separately coupled to the BMC, the computing part, and the first connector,
   wherein the storage component comprises a disk, a storage mainboard, the second memory, and a second connector,
   wherein the disk, the second memory, and the second connector are coupled to the storage mainboard,
   wherein the disk and the second memory are coupled to the second connector,
   wherein the second memory stores the backup configuration information and backup identity information of the computing part,
   wherein the backup configuration information of the computing part restores the configuration parameter of the computing part,
   wherein the first connector and the second connector match each other,
   wherein the BMC is coupled to the second memory using the first connector and the second connector when the first connector and the second connector are intercoupled,
   wherein the processor system is coupled to the disk using the first connector and the second connector when the first connector and the second connector are intercoupled, and
   wherein the method further comprises:
      obtaining, by the BMC, identity information of the computing part;
      obtaining the backup identity information of the computing part from the second memory;
      determining whether the identity information of the computing part is the same as the backup identity information of the computing part; and
      determining that the computing part is updated when the identity information of the computing part is different from the backup identity information of the computing part.

12. The method of claim 11, wherein restoring the configuration parameter of the computing part and driving the computing part comprises:
   restoring, by the BMC, the configuration parameter of the computing part according to the backup configuration information of the computing part stored in the second memory when the computing part is replaced; and
   driving, by the processor system, the computing part according to the preset driver package of the computing part stored in the first memory.

13. The method of claim 11, wherein restoring the configuration parameter of the computing part and driving the computing part comprises:
   restoring, by the processor system, the configuration parameter of the computing part according to the backup configuration information of the computing part stored in the second memory when the computing part is replaced;
   copying, into the disk, the preset driver package of the computing part stored in the first memory; and
   starting from the disk after copying is completed.

14. The method of claim 13, wherein copying the preset driver package of the computing part comprises:
   starting from the first memory;
   reading the preset driver package of the computing part from the first memory after starting; and
   copying the preset driver package of the computing part into the disk.

15. The method of claim 14, wherein the first memory is located in the computing component or in a management server associated with the server, wherein the BMC is coupled to the first memory, and wherein the processor system is coupled to the first memory.

16. The method of claim 11, wherein the second memory is further configured to store backup configuration information of the computing mainboard, and wherein the method further comprises:
   reading, by the BMC, the backup configuration information of the computing mainboard from the second memory; and
   configuring the computing mainboard according to the backup configuration information of the computing mainboard.

17. The method of claim 11, further comprising updating, by the BMC according to the identity information of the computing part, the backup identity information of the computing part stored in the second memory when the computing part is updated.

18. The method of claim 11, wherein when configuration information of the computing part is changed, the method further comprises updating, by the BMC according to the changed configuration information, the backup configuration information of the computing part stored in the second memory.

* * * * *

UNITED STATES PATENT AND TRADEMARK OFFICE
CERTIFICATE OF CORRECTION

PATENT NO. : 10,430,082 B2
APPLICATION NO. : 15/877997
DATED : October 1, 2019
INVENTOR(S) : Jinshui Liu, Tongling Song and Wei Liu It is certified that error appears in the above-identified patent and that said Letters Patent is hereby corrected as shown below:

In the Claims

Claim 1, Column 26, Line 19: "computing port" should read "computing part"

Signed and Sealed this
Nineteenth Day of November, 2019

Andrei Iancu
*Director of the United States Patent and Trademark Office*